May 26, 1964  T. P. HUBBARD, JR., ET AL  3,134,904
METHOD OF RADIOACTIVITY TRACER LOGGING
Filed Dec. 18, 1959

INVENTORS
THOMAS P. HUBBARD JR.
ARTHUR H. YOUMANS
BY
ATTORNEY

3,134,904
METHOD OF RADIOACTIVITY TRACER LOGGING
Thomas P. Hubbard, Jr., and Arthur H. Youmans, Tulsa, Okla., assignors to Well Surveys, Inc., a corporation of Delaware
Filed Dec. 18, 1959, Ser. No. 860,422
6 Claims. (Cl. 250—106)

This invention relates to the art of geophysical prospecting. The invention is especially concerned with radioactivity well logging, particularly, radioactivity tracer logging which is carried out in conjunction with the making of natural gamma ray logs, and with new tracer materials.

Radioactivity well logging is a well known form of geophysical prospecting which may be described briefly as involving the detection of radiations emanating from formations surrounding a borehole, for example an oil well borehole, by suitable radiation sensitive instrumentation suspended from a conducting cable. Usually, the detecting instrument is moved upwardly from a point in the well bore at a uniform rate, continuously passing the strata that are to be examined. The detecting instrument delivers electrical signals related to the intensity and/or energy of the radiation emanating from the formation, which signals are transmitted to instruments above ground, there to be translated into a form suitable for recording. The recording of the signals is according to the depth of origin of the corresponding radiation in the borehole, so as to provide an indication on the record of the characteristics of particular sections of the strata at successive levels.

There are various forms of radioactivity well logging known to those skilled in the art and it is not believed necessary to detail them here. It may be stated that the present invention is associated with what is known as natural gamma ray logging. This form of logging is perhaps the best known of all of the forms of radioactivity well logging, it having actually been in commercial use for approximately 20 years.

Similarly, tracer logging is a well known method of obtaining information concerning the underground strata. Insofar as tracer logging involves radiation phenomena, the method may entail the dissemination into the strata surrounding the borehole, either throughout the depth of the borehole or at localized points therein, of radiation-emissive material which is thereafter to be detected by radiation-sensitive instrumentation in a manner similar to the making of radioactivity well logs in general. Tracer logging may be regarded as somewhat of an adjunct to other forms of radioactivity well logging in that it provides information concerning the strata which is not obtainable by other methods. Briefly, to indicate some of the well known applications of tracer logging, it may be pointed out that this form of logging is employed to provide valuable additional information concerning permeability and porosity characteristics of the strata. One method of accomplishing this involves mixing a radioactive material with the well fluids, for example, drilling mud, applying pressure to the column of well fluid, and forcing it into the surrounding formations. The extent to which the surrounding strata have received the pressured fluids is thereafter determined as an indication of porosity and/or permeability by detecting the intensity of radiations emanating from the various strata. A record is made in a manner similar to that made in carrying out other radioactivity well logging techniques. Another application of tracer logging is in indicating the flow of underground fluids. This is particularly important in an area where a number of secondary recovery wells are being produced under gas or fluid pressure and it is desired to know the distribution of the pressurizing fluids from the various levels of their departure from the injection well. In this instance, the radioactive tracer material is included in the pressurizing gas or fluid and its arrival in the surrounding wells is detected by radiation-sensitive instrumentation thereby to provide an indication of the manner of movement of the underground fluids. Similarly, thief zones in wells that are being drilled may be detected. This is a particularly important application in that drilling fluids are expensive materials and their loss into the surrounding formations can become an extremely expensive item. Accordingly, it is desirable to know the location of such thief zones which are robbing the well proper of its expensive fluids so that the breaks or fissures in the walls of the borehole may be sealed off and additional losses prevented. This may be accomplished by including a radioactive tracer material in the well drilling mud and thereafter detecting the increase of radiation intensity at the point of the break in the well bore wall.

Tracer logging also is utilized to locate the position of cement which is applied between the well bore and the well bore casing so as to afford an indication of where perforating operations might be undertaken or whether or not the cement has performed its intended purpose of sealing off a particular fluid bearing zone or a thief zone.

The present invention is not restricted in its utility to any of the above described uses of tracer logging; rather, the present invention may be employed wherever tracer logging is desirable.

One of the difficulties heretofore encountered in radioactivity well logging has been the interference by tracer logging with other forms of logging. In particular, when radioactive materials are introduced into a well for the purpose of performing tracer logging operations, it ordinarily becomes impossible to make a log of natural gamma ray activity of the formations, except in a case where the injected radioactive material has a short half-life and is allowed to decay away before subsequent logging operations are conducted. As is well known, that is a serious disadvantage and entails delays in the making of other valuable logs, which is undesirable. Furthermore, in some instances in the past, powerful radiation emitters which present a hazard in themselves have been utilized.

In addition to the delay encountered in making the natural gamma ray log, it is also a facet of the previous practice that two logs, that is, natural gamma ray logs and the tracer log have required the traversing of the borehole on two separate occasions, thereby involving the expense of two separate logging operations. It is generally necessary that a natural gamma ray log be made in any borehole in which a radioactivity tracer log has been or is to be made in order that there be a base log from which to measure increases in radioactivity. Otherwise one could not tell whether a zone of high radioactivity was naturally so or made so by the tracer.

According to this invention, it is now possible to obtain simultaneously both a tracer log and a natural gamma ray log. Thus, there is not the delay involved in waiting for the decay of the tracer material prior to the making of the natural radioactivity log, and, furthermore, the additional expense involved in making two separate logs on two different occasions is avoided.

According to this invention, it is found, as may generally be described, that the foregoing mentioned advantages may be obtained by employing, in radioactive tracer logging operations, tracer material producing a relatively low response in a radiation detector, more especially, gamma-radiation emitters lower in energy than a major part of the gamma rays observed in natural gamma-ray logging. The tracer material is utilized or disseminated within the well bore and the surrounding formation to appropriate known means, methods, and purposes. When it is desired to log a well to obtained an indication of the information afforded by the distribution of the tracer material, and to log for natural radiation, a well logging instrument is employed wherein there is contained a detector arranged to be insensitive to the tracer. This may be accomplished by using a Geiger counter surrounded by a shield of lead or other suitable metal having a relatively high absorption cross section for the low energy tracer radiation. The log which results from the signal delivered by the lead-shielded Geiger counter provides a substantially unimpaired natural gamma-ray log. Mounted in the same well logging instrument is a second detector which may be a Geiger counter which is not shielded and, therefore, is sensitive to both the tracer radiations and natural gamma radiations. From the signal of this detector a log is made affording an indication of the information provided by the presence of the tracer by a simple comparative analysis of the latter log with the natural gamma-ray log. This may be done automatically by a ratemeter arranged to indicate automatically the difference between the two log deflections at each point along the borehole. Zones in the formation where the tracer radiation is intense will stand out quite apparently from the logs and may, for example, indicate the accumulation of mud cake or filtrate at particular zones of the formation.

Another manner of operation permissible within this invention involves the use within the borehole of a single detector of the type producing electrical pulses of magnitudes related to the energies of the incident radiations, which detector detects both the natural gamma radiation and the radiations from the tracer material. As those skilled in the art will understand, this combined signal may be delivered to discriminating means, one channel of which is set to pass the entire range of pulse magnitudes being delivered thereto, and another channel of which is set to pass only those pulses with magnitudes greater than the magnitude representing a given energy level or threshold. Alternatively, the first channel may pass a limited range of pulse magnitudes.

For example, fluid is injected into a well under pressure and containing the tracer material of this invention. The logging operation is carried out over the zone of interest while the well is pumped or allowed to flow. As will be understood, a fall-off of radiation intensity of the tracer fluid will indicate dilution of the tracer fluid at the point at which the fluid enters the well.

As to uses of the invention, numerous ones will occur to those skilled in the art. In fact, practically any of the well known uses of tracer logging may be practiced according to the teachings of this invention.

As indicated above, according to the invention, tracer material is employed which emits gamma radiation substantially all lower in energy than a major part of that observed in natural gamma-ray logging. Preferably, the tracer radiations should be lower than about 200 kev. as a maximum; however, those skilled in the art will understand that the invention can be practiced with decreasing satisfaction with tracer materials emitting gamma radiation as high as about 1.5 mev.; however, a more practical upper limit is about 500 kev. Examples of suitable tracer materials of the preferred type are xenon 133, palladium 109, cerium 141, cerium 144, and osmium 191. Various compounds of these preferred materials may be employed wherever desired or feasible, although, xenon is not known to combine with any other element. Other materials suitable for use as the tracer in addition to those in the preferred group are such as iodine 131, cesium 137 and iridium 192.

As those skilled in the art will appreciate, the amount of tracer material required depends upon the particular tracer operation being performed, inasmuch as the nature of the operation determines how much of the tracer material is retained in and about the borehole and how long the activity must persist to permit the making of the desired study. It is clear, of course, that in all operations, sufficient tracer material should be employed to override any disturbing factors.

A further advantage of this invention will be observed in that, because of the fact that a background or natural gamma-ray log may be made simultaneously with the tracer log, large amounts of the tracer materials are not required to be used. Accordingly, the invention provides methods which are exceptionally free of the hazard due to radioactivity, and, therefore, the new tracer materials may be employed in cement, fracture treatment materials, or casing collars and the like without excessive or undue danger to those handling the materials. For example, osmium 191 is especially suited for use in cement and also the lubricant used in making up casing joints.

As exemplary of the manner of practicing the invention, in determining porosity and permeability while making a natural gamma-ray log, the trichloride of osmium 191 is mixed with drilling fluid in quantity of about one microcurie per gallon. This fluid is employed in the drilling of the well. When it is desired to examine the formations traversed in the drilling, a well-logging instrument containing a detector sensitive to substantially the full range of energy of the radioactivity present in the borehole is employed to log the borehole. The detector is associated with necessary circuitry and signal translating instruments, including among other things, a pulse height discriminator, one channel of which is set to deliver as its output a signal including the full energy range, i.e., both the relatively small pulses due to osmium 191 radiations and the pulses due to natural radioactivity of the formation, and another channel of which is set to deliver a signal excluding the pulses due to osmium 191 as well as the lower energy pulses in the spectrum of natural radioactivity. Thus, as the instrument is raised in the borehole two curves are provided, one reflecting natural radioactivity plus osmium 191 activity, and the other, only natural radioactivity. Both curves are, in well known manner, correlated with borehole depth to produce logs of the respective activities as a function of depth. The logs may then be compared for meaningful differences. Where the full range log shows increased intensity of radiation detection as compared with the limited range log, such will indicate the permeation of the formation by the tracer in substantial amount, leading to the conclusion of the presence of a significantly permeable and porous zone and the possibility of oil. The natural gamma-ray log of course affords, in and of itself alone, its characteristic information.

Alternatively, an insoluble tracer material such as an oxide of osmium 191 may be employed in the drilling fluid. In this case, the tracer will be deposited on the face of any permeable formations. Logs obtained as previously described will reveal the location of these permeable zones.

Additionally, in old wells, i.e., wells which do not contain drilling fluids and therefore permit injections of fluids into the permeable formations, the particulate type tracer material and injection method as disclosed in U.S. Patent No. 2,810,076, issued to Edwin S. Mardock may be employed with the present invention with additive benefits.

It will be appreciated that the new tracer logging techniques herein described have application throughout the many instances of general use of tracers. Some applications have already been noted and others may be mentioned. For example, fluid containing the tracer of this invention may be pumped into a well containing a logging instrument equipped to follow the descending interface between an inert fluid present in the well and the tracer bearing fluid. This affords measurement of fluid flow rates and also provides an indication of the location of permeable zones. Another form of application involves loading the well with tracer bearing fluid and examining the fluid throughout its depth for dilution of the tracer fluid by fluids entering the well in order to determine the points of entry of fluids entering from the formation. These are well known uses of tracer logging and they are especially suitable uses for the present invention because of the short range radiations emitted by the herein mentioned tracer materials.

Further, this method may actually be practiced using two scintillation detectors with different discriminator adjustments, although obviously only one detector (with two discriminators) is necessary. Another alternative is to utilize a differential discriminator in isolating the tracer information; this would ignore the higher energy gamma rays and make a separate log of the tracer material. Of course the gamma rays from the tracer will fall in the same range as some of the natural gamma rays; the latter may be ignored if enough tracer material is used or they may be accounted for, since the number in the range of the tracer gamma rays is substantially proportional to the number of more energetic gamma rays, and the natural gamma ray log may be used to determine the number of natural gamma rays in such range that must be accounted for.

In actual practice it will be appreciated the selected tracer material may frequently be contaminated by isotopes emitting radiation of higher quantum energy. This will of course interfere to some extent with the ideal performance of the method as herein disclosed. However, the invention contemplates the successful application of the method even under such circumstances by means of the following modified technique. Due to the presence of the aforesaid high energy contaminants it may be impossible to produce directly a log of natural radioactivity which responds correctly in every formation in the borehole. That is, in those zones where tracer material exists a small incremental response in the curve representative of natural radioactivity will result. This incremental response will be proportional to the total amount of tracer deposited at these points, and to the relative amount of contamination of the tracer by the aforementioned high quantum energy isotopes. The latter factor will of course be constant throughout the well whereas the former will vary from point to point. In order to interpret the log it is only necessary that the two curves be properly normalized. To this end the curves may be displayed so that they indicate the same amplitude in zones known to be impermeable. Ordinarily many such zones exist in a well and it is required only that the curves be so arranged that their deflections coincide in one zone of high natural radioactivity and in one zone of low natural radioactivity, both zones being impermeable. This having been done, it will be observed that the two curves will coincide in every zone where no tracer exists and will depart in every zone where tracer does exist, the degree of departure being indicative of the quantity of tracer at each point in the well.

Alternatively if the above method of normalization is inconvenient to perform, the two curves may be run at any convenient amplitude scale or sensitivity. Then to interpret the results a graph may be plotted from which the presence of tracer may be conveniently deduced and the quantity evaluated.

This method may be illustrated by reference to the drawings, in which.

Figure 1:
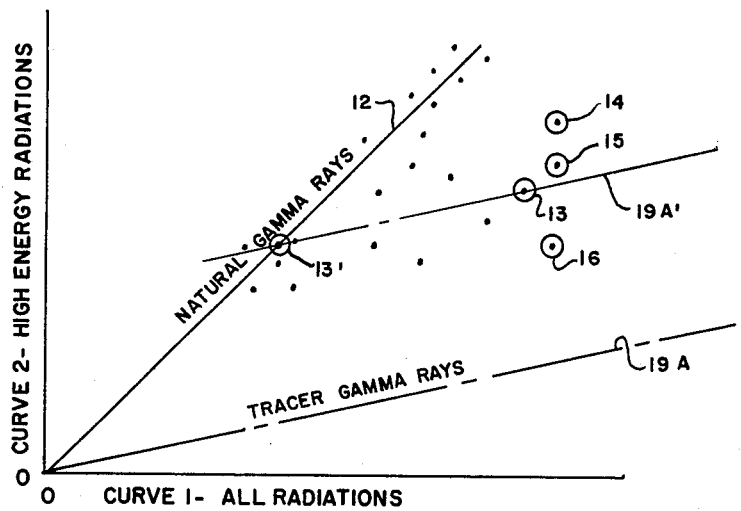
FIG. 1 is a record of high energy radiations as a function of all radiations for various depths in the well, using the method of this invention.
Figure 3:
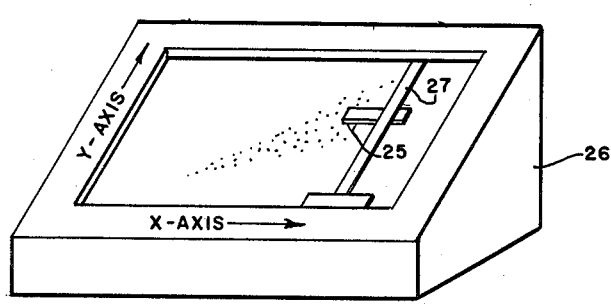
FIG. 3 is an illustration of an X—Y recorder for making the record of FIG. 1.

To accomplish the above evaluation one may prepare a graph on which are plotted, as in FIG. 1, points representing the respective log deflections for each of the curves at various points in the well. This may be done manually or by use of a conventional X—Y recorder such as recorder 26 illustrated in FIG. 3 wherein the logging signal of one curve drives carriage 27 along the X-axis, and the logging signal of the other curve drives pen 25 along carriage 27 in the Y-direction. The pen automatically marks at the appropriate times, making the record of FIG. 1. In FIG. 1 curve 1 is taken to represent the log responsive to substantially all radiations including both natural radioactivity and tracer radioactivity; curve two then represents the log responsive to only the relatively high energy radiation in the well. It will be apparent that for all locations in the well where no tracer material exists, the points representing the respective log deflections will define a straight line 12 within the accuracy of the logging measurement, if as previously assumed, the natural radioactivity radiation spectrum is substantially the same from point to point in the well. It is of course well known that the relative amounts of thorium, radium and potassium do differ from formation to formation. However, these variations cause only an insignificant variation in the response of radiation detectors having a discriminating level in the range of 500 kev. or lower. Zones in the well where tracer exists will be represented by points such as point 13 of FIG. 1. This departure from the straight line clearly indicates that the relative amplitude of curve 1 is greater than it would have been had the tracer material not been present. So similarly points 14, 15, and 16 indicate zones where tracer material is detected. Further, the detector response contributed by the tracer may be read directly from the graph.

The mechanics of interpretation of the graph of FIG. 1 are now explained in some detail. The presence of low energy radiations from the tracer material causes curve 1 to increase relative to curve 2, which is a measure of only relatively high energy radiations. Thus the presence of tracer at a particular depth in the borehole causes the point in FIG. 1 that represents that depth to be displaced to the right compared to where it would have been were there no tracer present. Thus the line 12, which passes through the points, where no tracer is present, lies along the left extreme of the points plotted in FIG. 1. Displacement from this line indicates the presence of tracer. The amount of displacement indicates the amount of tracer; however, for an accurate measure of the amount of tracer, there must be a calibration of the graph. Line 12 necessarily passes through the origin for the reason that when there are no natural gamma radiations, there are obviously no high energy natural gamma radiations. When there are no high energy contaminants in the tracer material, the presence of tracer causes a point to be displaced directly to the right with no vertical component. The amount of displacement to the right is a measure of the amount of tracer present. Calibration may be effected by placing a standard amount of the tracer material in a predetermined relation to the measuring instrument, when it is adjusted for logging operation. The response of curve 1 and curve 2 is noted to provide the calibration.

Figure 2:
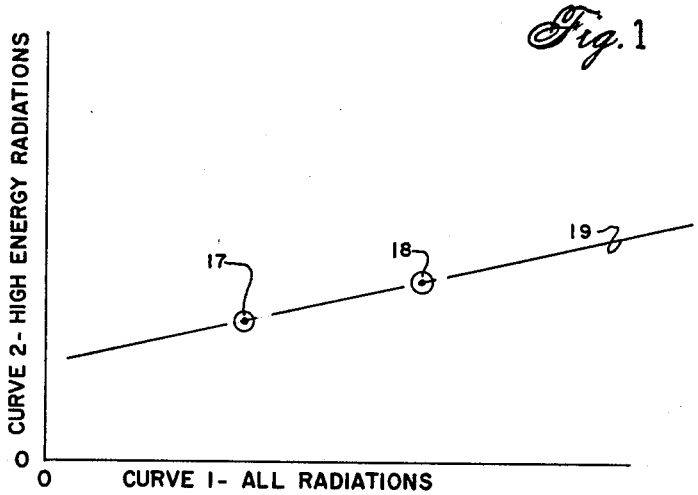
FIG. 2 is a record of high energy radiations as a function of all radiations for a calibration measurement.

As noted above, the invention may be used even where there is contamination of the tracer material with high energy components. In this case, it is necessary to determine how much high energy radiation relative to all radiation is contributed by the tracer material. Sometimes this ratio is known. However, for various drilling muds and borehole conditions, the relative amounts detected may vary somewhat from the relative amounts emitted by the tracer. In such instances the ratio can be determined empirically by calibration measurements made under known conditions. One method is by making measurements of a representative formation or a representative sample before and after the addition of tracer material. Such calibrations would be valid whenever similar conditions are obtained. The manner of such calibration is explained in conjunction with FIG. 2. The plot of curve 2 as a function of curve 1 where no tracer has been added, produces point 17. Upon the addition of a known amount of the tracer, point 18 is produced. The slope of line 19 joining the two is the ratio of high energy tracer radiations to all tracer radiations, since the natural gamma radiations were the same for both measurements. For convenience, line 19A has been plotted on the graph of FIG. 1 having the slope of line 19, determined in the calibration procedure, but passing through the origin. In the same manner and for the same reasons that point 18 was displaced from point 17 along a line of the slope of line 19A, so the points displaced from line 12 are displaced from the points on line 12 where they would have fallen had no tracer been present. For example, take point 13. Were no tracer present at the depth in the well related to point 13, point 13 would have fallen at point 13', the point on line 12 displaced from point 13 along a line 19A' having the slope of line 19A. Point 13' therefore indicates the natural gamma radiation at the depth represented by point 13, and the displacement of point 13 with respect to point 13' indicates the amount of tracer present. Since the angle between lines 12 and 19A is a constant, the displacement of a point, such as point 13, perpendicularly from line 12 is a constant known fraction of its displacement along line 19A' and is therefore also a measure of the amount of tracer present, with a different but determinable constant of proportionality.

Where the high energy contamination is large, even to the exclusion of low energy radiation, the method is still operable. In such a case the slope of line 19A would be greater than that of line 12, but otherwise the natural gamma ray component and tracer component can be determined in the same manner. It is necessary only that the tracer spectrum differ substantially from the natural gamma ray spectrum. Thus by this technique satisfactory operation of the invention is possible even with unfavorable mixtures of isotopes being employed as tracers.

What is claimed is:

1. A method of geophysical prospecting which comprises preparing a well for tracer logging study utilizing a radioactive tracer material emitting gamma radiations substantially all of which are of energy less than a pre-established energy level; and logging said well by radioactivity logging methods, and, in the course thereof, simultaneously obtaining a curve indicative of radiation due to tracer activity and a curve exclusive of substantially all of said tracer activity but inclusive of natural gamma radiations of energies above said pre-established level, thereby to provide a tracer log and a natural gamma ray log.

2. A method of prospecting as claimed in claim 1 wherein natural gamma radiations and tracer gamma radiations are detected, and the resulting electrical signals are selectively apportioned to provide two signals ultimately to be observed, one of which is based upon substantially the full energy range of said gamma radiations and the other of which is based upon a limited energy range excluding gamma radiations of energies below said pre-established level.

3. A method of prospecting as claimed in claim 1 wherein natural gamma radiations and tracer gamma radiations are detected with the same detection medium to provide electrical pulses with magnitudes systematically related to the energies of respective incident gamma radiations, the resulting electrical pulses are selectively apportioned to provide two groups of pulses, one of which includes only those of magnitudes related to gamma ray energies above said pre-established level and the other of which excludes at least those of magnitudes related to gamma ray energies above said pre-established level, and the rate of occurrence of pulses in each group is utilized to provide said curves.

4. A method of geophysical prospecting which comprises preparing a well for tracer logging study utilizing a tracer material emitting radiations with energies below about 500 kev.; detecting natural gamma radiation originating in the formation surrounding said well and the radiation originating with said tracer, and, simultaneously therewith, detecting only gamma radiations of above 500 kev.; preparing a visible indication of information afforded by each of said detecting operations thereby to provide a tracer log and a natural gamma-ray log.

5. A method of geophysical prospecting which comprises preparing a well for tracer logging study by utilizing a radioactive tracer material emitting radiations of a maximum energy less than a pre-established energy level, detecting natural gamma radiations originating in the formation surrounding said well and the radiations originating with said tracer, and, simultaneously therewith, detecting radiations having energy levels above said pre-established level, thereafter deriving a visible indication of information afforded by each of said detecting operations to provide a tracer log and a natural gamma ray log.

6. A method of geophysical prospecting which comprises preparing a well for tracer logging study utilizing a radioactive tracer material emitting radiations substantially all of which produce detector response less than natural gamma rays of a pre-established energy level, logging said well by radioactivity logging methods and, in the course thereof, obtaining a curve indicative of radiation due to tracer activity and a curve exclusive of substantially all of said tracer activity but inclusive of natural gamma radiations of energies above said pre-established level, thereby to provide a tracer log and a natural gamma ray log.

References Cited in the file of this patent

UNITED STATES PATENTS

| Number | Name | Date |
|---|---|---|
| 2,296,176 | Neufeld | Sept. 15, 1942 |
| 2,298,794 | Howell | Oct. 13, 1942 |
| 2,308,176 | Howell | Jan. 12, 1943 |
| 2,385,378 | Piety | Sept. 25, 1945 |
| 2,644,891 | Herzog | July 7, 1953 |
| 2,670,442 | Herzog | Feb. 23, 1954 |
| 2,680,900 | Linderman | June 15, 1954 |
| 2,710,925 | McKay | June 14, 1955 |
| 2,751,506 | Black et al. | June 19, 1956 |
| 2,752,504 | McKay | June 26, 1956 |
| 2,778,947 | Scherbatskoy | Jan. 22, 1957 |
| 2,785,314 | Grahame | Mar. 12, 1957 |
| 2,811,650 | Wagner | Oct. 29, 1957 |
| 2,971,094 | Tittle | Feb. 7, 1961 |